United States Patent [19]

Sato et al.

[11] Patent Number: 4,576,699
[45] Date of Patent: Mar. 18, 1986

[54] MAGNETO-OPTICAL RECORDING MEDIUM AND METHOD OF MAKING SAME

[75] Inventors: Noboru Sato, Kanagawa; Tomiji Tanaka, Tokyo, both of Japan

[73] Assignee: Sony Corporation, Tokyo, Japan

[21] Appl. No.: 613,383

[22] Filed: May 23, 1984

[30] Foreign Application Priority Data

May 25, 1983 [JP] Japan ................................. 58-92067

[51] Int. Cl.$^4$ ......................... C23C 15/00; G11B 5/64
[52] U.S. Cl. .......................... 204/192 M; 204/192 P; 365/122; 360/114; 428/694; 428/693; 428/900; 428/928; 427/131; 427/132; 428/678
[58] Field of Search ...................... 204/192 M, 192 P; 428/694, 900, 693, 678, 928; 427/132, 131; 365/122; 360/114

[56] References Cited

U.S. PATENT DOCUMENTS

| | | | |
|---|---|---|---|
| 3,229,273 | 1/1966 | Baaba | 428/900 |
| 4,042,341 | 8/1977 | Smeggil | 428/678 |
| 4,210,946 | 7/1980 | Iwasaki | 428/900 |
| 4,277,809 | 7/1981 | Fisher | 428/900 |
| 4,293,621 | 10/1981 | Togami | 428/678 |
| 4,367,257 | 1/1983 | Arai | 428/220 |

*Primary Examiner*—Ellis P. Robinson
*Attorney, Agent, or Firm*—Hill, Van Santen, Steadman & Simpson

[57] ABSTRACT

An improved magneto-optical recording medium and a method of making the same, the medium including a substrate base and a magneto-optical recording layer formed on the base and composed of a plurality of layers each of which contains a rare earth metal and a transition metal. The relative concentration ratio between the rare earth metal and the transition metal in the layers varies cyclically in the direction of the thickness of the magneto-optical recording layer. The recording medium is conveniently manufactured by simultaneously depositing the transition metal and the rare earth metal by co-sputtering the two metals on a base and providing relative movement between the base and the metal sources during co-sputtering to produce the multilayer recording structure.

4 Claims, 10 Drawing Figures

MAGNETO-OPTICAL RECORDING MEDIUM AND METHOD OF MAKING SAME

BACKGROUND OF THE INVENTION

1. Field of the Invention

The present invention is in the field of magneto-optical recording media containing a recording layer composed of a plurality of individual layers each of which contains a rare earth metal and a transition metal which vary in relative proportion between the individual layers.

2. Description of the Prior Art

There are magneto-optical disks suggested in the prior art which can be recorded on and/or read out by a laser beam such as a semiconductor laser beam. Such magneto-optical disks are commonly made of an amorphous alloy of a rare earth metal and a transition metal. A "transition metal" is defined as a metal in which the available electron energy levels are occupied in such a way that the d-band contains less than its maximum number of 10 electrons per atom and includes metals such as iron, cobalt, nickel, and tungsten.

It is common to use a sputtering process to obtain such a magneto-optical disk for use as a magneto-optical recording medium. In the past, a single sputtering source has been used to accomplish this result. The sputtering source or target is constructed such that pellets or other thin pieces of rare earth metal are located on a transition metal target. These metals are then simultaneously deposited on a substrate or base through a sputtering process.

FIG. 1 of the drawings illustrates a magnetization graph which plots intensity of magnetization against the intensity of the magnetic field of the magneto-optical recording medium thus made. As shown in FIG. 1, the prior art magneto-optical recording medium has a poor squareness ratio in its hysteresis characteristic. Accordingly, when an external magnetic field is applied to the record medium, the recorded level of the medium is deteriorated and hence the S/N (signal-to-noise) ratio is lowered. In addition, the conventional sputtering method has a defect in that it is quite difficult to obtain the magneto-optical recording medium as a uniform sputtered layer which has uniform magnetic characteristics over the entire area of the record medium.

SUMMARY OF THE INVENTION

The present invention seeks to provide an improved magneto-optical recording medium which can eliminate the above defects inherent in the prior art and its manufacturing method. In the present invention, there is provided a magneto-optical recording medium having uniform and improved magnetic characteristics at each portion thereof as well as an improved manufacturing method. The present invention provides a magneto-optical recording medium having a high coercive force, excellent squareness ratio, a high S/N ratio and an improved manufacturing method.

In accordance with the present invention, we provide a magneto-optical recording medium comprising a substrate base, and a magneto-optical recording layer formed on the base, the recording layer containing a rare earth metal and a transition metal whose relative concentration ratio is cyclically varied in the direction of thickness of the magneto-optical recording medium. To put it another way, the relative concentration of each metal varies sequentially above and below an average value along the thickness dimension of the recording layer.

The present invention is also involved with a method of manufacturing an improved magneto-optical recording medium which method includes the steps of providing both a transition metal target or source and a rare earth metal target or source opposite to the base, the sources being in spaced relation to each other, depositing the transition metal and the rare earth metal simultaneously from the respective sources on the base by a co-sputtering process so that the sputtered positions do not coincide and providing relative movement between the base and the metal sources to form on the base a magneto-optical recording layer which contains the rare earth metal and transition metal with the composition ratio between the two varying cyclically in the direction of the thickness of the magneto-optical recording layer.

Other objects, features and advantages of the present invention will become apparent from the following description taken in conjunction with the accompanying drawings.

DESCRIPTION OF THE PREFERRED EMBODIMENTS

The present invention will be further described in connection with the drawings accompanying this application.

Figure 2:
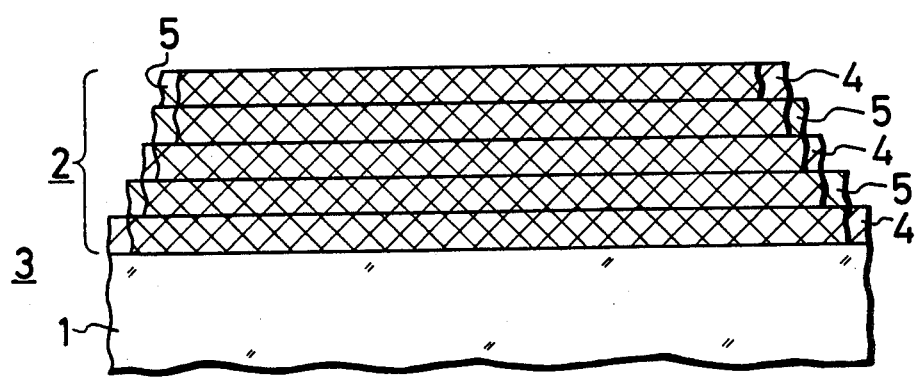
FIG. 2 is a schematic, enlarged cross-sectional view showing an embodiment of the magneto-optical recording medium according to the present invention.
Figure 3A:
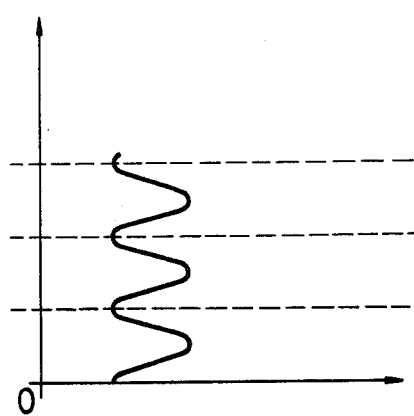
FIGS. 3A and 3B are respectively graphs showing the distribution of components of the magneto-optical recording medium shown in FIG. 2.
Figure 3B:
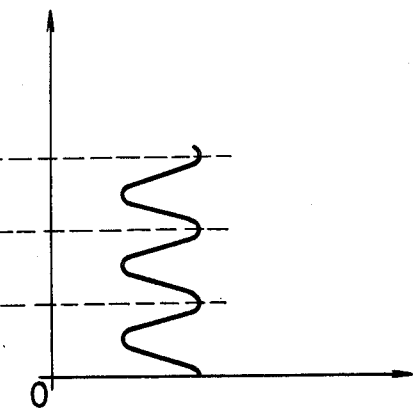

In accordance with the present invention, as shown in FIG. 2, there is provided a substrate 1 in the form of a disk or the like and consisting of glass, an acrylic resin, a polycarbonate resin, or the like. On the substrate 1 there is deposited a magneto-optical recording layer 2 containing elemental metal substances or alloys of rare earth metals such as terbium (Tb) or gadolinium (Gd) or the like. The recording layer also contains elemental metals or alloys of transition metals, such as Fe, Co, Ni, or the like, the former two being preferred, in an alternating multilayer structure which in combination with the substrate 1 produces a magneto-optical recording medium 3. In accordance with the present invention, the relative compositional ratio between the rare earth metal and the transition metal in the recording layer 2 is cyclically changed along the direction of the thickness of the recording layer 2. In other words, the concentration of each of the two metals varies above and below an average value along the thickness dimension of the layer. This is particularly illustrated in FIGS. 3A and 3B which show the relative amounts of rare earth metal and transition metal respectively through the individual layers. It will be noted that the respective concentrations of rare earth metal and transition metal are periodically varied in such a fashion that one is large while the other is small and vice versa.

In accordance with the present invention, the rare earth metal and the transition metal are provided from different sputtering sources from which both metals are deposited on the substrate base by a co-sputtering process simultaneously, to produce the magneto-optical recording medium 3. In order to provide separate sputtered positions for both the sputtering sources, the relative position between the sputtering sources and the base and also the mask form disposed between the sputtering sources and the base are selected appropriately. Then, by rotating the sputtering sources relative to the base 1, the rare earth metal layers 4 and the transition metal layers 5 are deposited on the base in an alternating multilayer structure as shown in FIG. 2 so that the compositional ratio between the rare earth metal and the transition metal is cyclically changed in the direction of thickness of the recording layer 2. It is desirable for each of the rare earth metal layers 4 and each of the transition metal layers 5 to diffuse the respective metals into the previously deposited and adjacent transition metal layer 5 and a rare earth metal layer 4 so that a layer composed only of rare earth metal or only of transition metal is precluded from being formed.

It is also important that the growing speed of each of the metal layers produced by the sputtering process be controlled to the range of 2 to 20 Å/sec, particularly 5 to 10 Å/sec, and the relative rotational speed between the base 1 and the sputtering sources and other sputtering conditions are appropriately adjusted to achieve this effect. It has been confirmed that if the relative rotational speed between the base 1 and the sputtering sources is too rapid and the growing speed of each metal layer becomes less than 2 Å/sec, the transition metal and the rare earth metal are deposited only with difficulty in a multilayer structure. It has also been confirmed that if the growing speed exceeds about 20 Å/sec, the magnetic characteristics of the layer thus produced are lowered.

Figure 4:
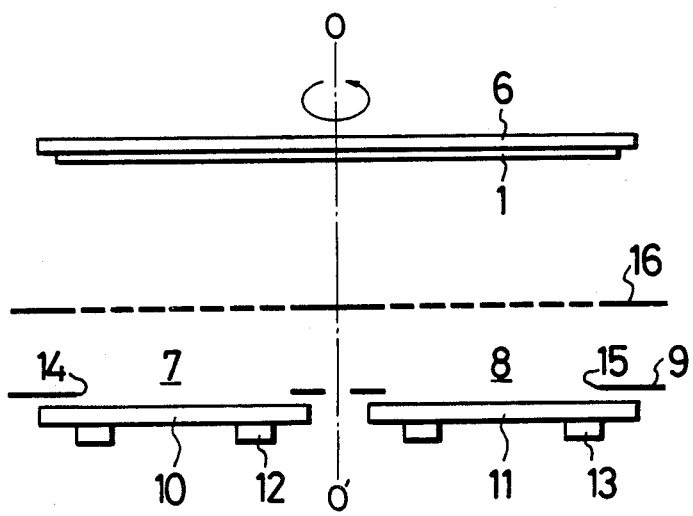
FIG. 4 is a schematic diagram of an example of a sputtering apparatus which can be used to carry out the manufacturing method of the present invention.

The sputtering apparatus used for manufacturing the improved record medium of the invention can be of the magnetron type but in accordance with the present invention, the sputtering apparatus is made into a special arrangement. FIG. 4 illustrates schematically an example of a sputtering apparatus for carrying out the method of the present invention. There is provided within an evacuated enclosure such as a bell jar (not shown) a turntable 6 which is disposed for rotation about an axis O-O'. A base 1 made of glass, resin, or the like, is mounted on the lower surface of the turntable 6 for deposition of the metals or alloys thereon. A pair of sputtering sources 7 and 8 are disposed in opposed relation to the base 1 with an equal angular spacing such as an angular spacing of 180° about the axis O-O'. A mask 9 is disposed between the sputtering sources 7,8 and the turntable 6 carrying the base 1 to restrict sputtered patterns of metals from the sputtering sources 7 and 8. The sputtering source 7 includes a target 10 formed, for example, of a disk-shaped plate composed of the rare earth metal Tb or an alloy thereof, while the sputtering source 8 includes a a target 11 formed, for example, of a disk-shaped plate made of a transition metal such as Fe or an alloy thereof. Reference numerals 12 and 13, respectively, designate magnets located beneath the targets 10 and 11.

Figure 5:
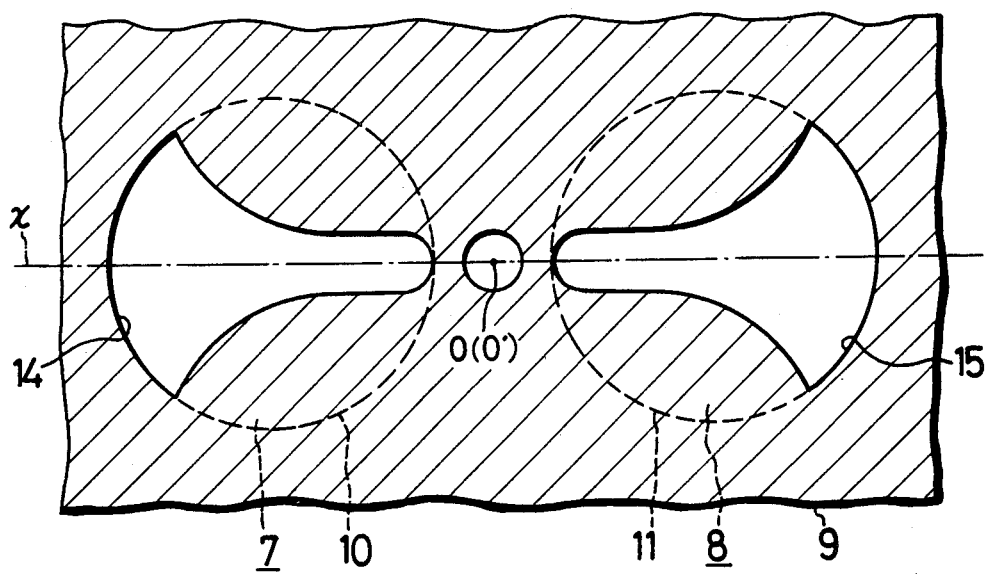
FIG. 5 is a plan view on an enlarged scale of a portion of the apparatus shown in FIG. 4.

As shown in FIG. 5, the mask 9 is provided at those portions opposite to the targets 10 and 11 with a pair of two windows 14 and 15 of a bell shape extending in expanding relation toward both ends of a straight line shown by reference character x which passes through the centers of the targets 10 and 11. When the turntable 6 is stopped in rotation, the rare earth metal is deposited from the target 10 on mainly one-half portion of the base 1 through the window 14 while the transition metal is deposited from the other target 11 mainly on the other half portion through the window 15 by the sputtering process. Then, a D.C. sputtering process is employed with the targets 10 and 11 being used as negative electrodes while rotating the turntable 6.

In FIG. 4, reference numeral 16 indicates a shutter located between the mask 9 and the turntable 6 which is used to prevent the sputtering from the targets 10 and 11 from arriving at the base 1 before the targets 10 and 11 are heated to a suitably high temperature.

Figure 1:
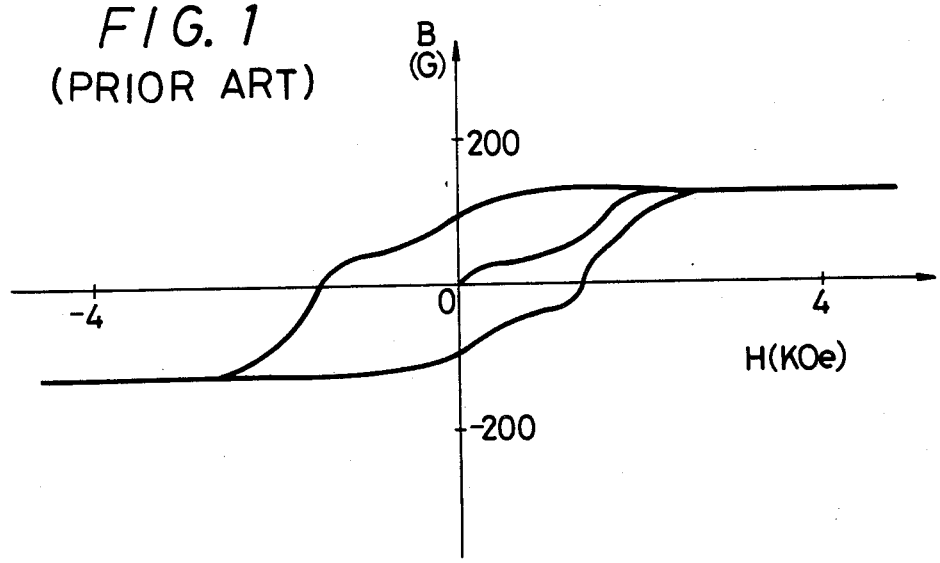
FIG. 1 is a magnetization curve of a conventional magneto-optical recording medium of the prior art.
Figure 6:
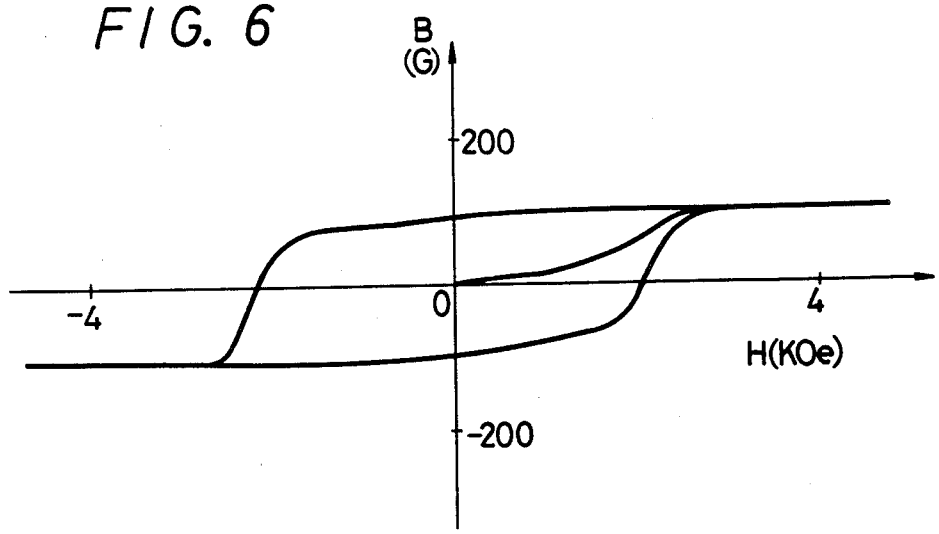
FIG. 6 is a magnetization curve of the magneto-optical recording medium according to the present invention.

In one example of a manufacturing method according to the present invention, a sputtering process was employed in which the turntable 6 was rotated at a speed of one rotation/3 seconds for 6 minutes, namely, for 120 rotations. In this case, a layer of 1000 Å in thickness was deposited on the base as a whole. The metal layer thus formed consisted of a recording layer containing both components of Tb, and Fe, with the compositional ratio thereof changing cyclically as indicated in FIGS. 2 and 3. In this case, the magnetization curve indicated an improved squareness ratio and coercive force Hc as shown in FIG. 6.

The reason that the squareness ratio and the coercive force Hc are improved can be described as follows. In general, the coercive force Hc depends on magnetic anisotropy and magnetostriction. In the magneto-optical recording medium of the present invention, the magnetic anisotropy is provided by the mutual action of both components in the alloy composed of the rare earth metal and the transition metal. The magnetostriction is generated inside the layer by the difference in composition ratios of both components in the direction of the thickness of the recording layer. The magnetic anisotropy and the magnetostriction thus generated may be considered as contributing to the improvements of the coercive force Hc and the squareness ratio.

Figure 7:
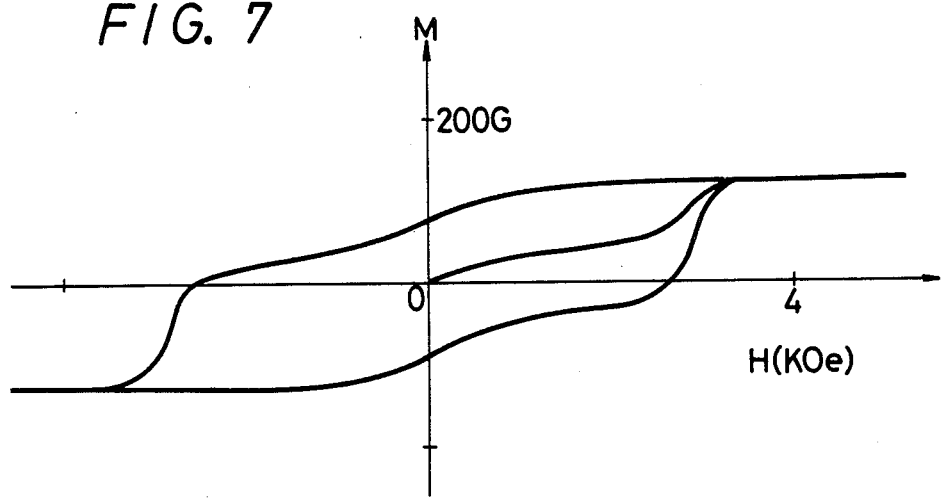
FIGS. 7 and 8 are magnetization curves useful for explaining the present invention.
Figure 8:
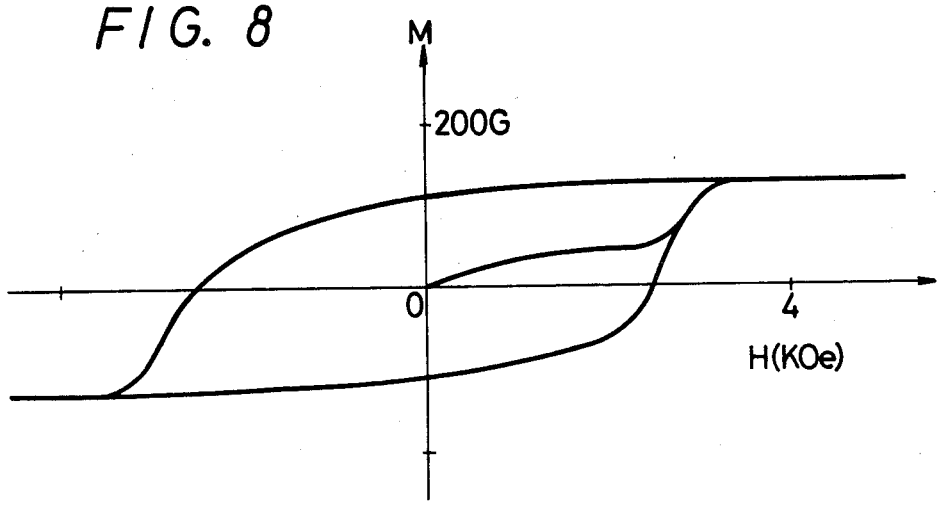

It is desirable that the sputtering process employed by a D.C. sputtering method. FIGS. 7 and 8 are curves showing the respective magnetization curves of the recording media formed by a radio frequency sputtering method and a D.C. sputtering method, respectively. By comparing FIGS. 7 and 8, it will be clear that the magnetization curve in the case of the D.C. sputtering method provides a better squareness ratio characteristic (FIG. 8) than in the case of the radio frequency sputtering method (FIG. 7).

While in the above embodiments, the rare earth metal and the transition metal are used in elemental form, one or both may be in the form of a combination of two or more elements. For example, a TbGd alloy may be used as a rare earth metal source and an FeCo alloy as the transition metal source. When the rare earth metal and- /or the transition metal are composed of a metal containing two elements or more, the following method can be used. The target 10 and/or 11 is formed of the above-mentioned alloy. The portion facing the window 14 and/or 15 of the mask 9 is arranged such that the ratio between the areas of the respective metal portions becomes equal to the composition ratio between the finally deposited metals. The other metal pellet is superposed on a metal plate as the target 10 and/or 11 of the sputtering sources.

As described above, the rare earth metal and the transition metal are deposited from different sputtering sources. Each of the metals may be provided from a plurality of sources.

As set forth above, the present invention makes it possible to obtain a magneto-optical recording medium having a high coercive force and an excellent squareness ratio, and thereby provide a high S/N ratio.

Furthermore, the anisotropy constant Ku of the layer magnetized normal to the surface of the magneto-optical recording layer is on the order of $10^6$ erg/cc which is higher than that of the prior art recording layer by one order of magnitude. In other words, according to the present invention, the coercive force Hc is raised so that the recording layer has an excellent life and thermal stability, and a higher density magnetic recording becomes possible. More specifically, the minimum diameter d of a recorded bit is determined by:

$$d \alpha \frac{Ew}{Ms \cdot Hc}$$

where Ew is the magnetic wall energy and Ms is the saturated magnetization. Thus, the larger coercive force value Hc makes the diameter d of the recorded bit smaller so that the recording density can be improved.

Figure 9:
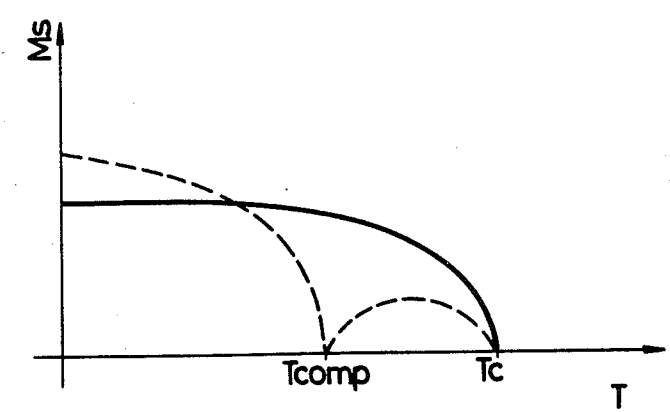
FIG. 9 is a graph showing the relationship between saturated magnetization and temperature for the magneto-optical recording medium of the present invention, and the medium of the prior art.

In addition, the saturated magnetization-temperature characteristic of the prior art magneto-optical recording layer exhibits ferromagnetism as shown by the broken line in FIG. 9 so that the prior art magneto-optical recording medium when used at room temperature is in the vicinity of its compensation temperature Tcomp. In contrast, since the saturated magnetization-temperature characteristic of the magneto-optical recording layer according to the present invention has a magnetic characteristic shown by the solid line in FIG. 9, and its compensation temperature is considerably lower, the stability of the magnetic characteristic and the intensity of magnetization can be improved.

The above description provides a single preferred embodiment of the invention, but it will be apparent that many modifications and variations can be effected by one skilled in the art without departing from the spirit or scope of the novel concepts of the invention, so that the scope of the invention should be determined by the appended claims only.

We claim as our invention:

1. A method for manufacturing a magneto-optical recording medium comprising the steps of:
   providing a transition metal source and a rare earth metal source in spaced relation,
   simultaneously depositing said transition metal and said rare earth metal by co-sputtering the two metals on a base, and
   providing relative movement between said base and said source during such co-sputtering to produce a multilayer recording layer in which the relative concentration between said rare earth metal and said transmission metal varies cyclically in the thickness dimension of the recording layer.

2. A method according to claim 1 in which:
   said layers are deposited at a deposition speed of from 2 to 20 Å/sec.

3. A method according to claim 1 in which said layers are deposited at a deposition speed of from 5 to 10 Å/sec.

4. A method according to claim 1 wherein said relative concentration of said metal varies sequentially above and below an average value along the thickness dimension of said recording layer.

* * * * *